April 28, 1970    A. E. ERICSON    3,508,473
FLEXIBLE BAG FOR PACKAGING FOOD ITEMS
Original Filed Dec. 6, 1966

INVENTOR.
ALVIN E. ERICSON
BY
ATTORNEY

United States Patent Office 3,508,473
Patented Apr. 28, 1970

3,508,473
FLEXIBLE BAG FOR PACKAGING FOOD ITEMS
Alvin E. Ericson, Chicago, Ill., assignor to Union Carbide Corporation, a corporation of New York
Original application Dec. 6, 1966, Ser. No. 599,557. Divided and this application Nov. 2, 1967, Ser. No. 708,451
Int. Cl. B31b 49/04
U.S. Cl. 93—35
3 Claims

ABSTRACT OF THE DISCLOSURE

A method of making a flexible bag for packaging irregularly shaped items in which a straight line cut made transversely of tubular film has two adjacent angular cuts on either side joined by arcuate cuts into a continuous cut from one edge of the film to the other. The bottom of the bag is formed by sealing along the line of the cuts.

---

This application is a division of application Ser. No. 599,557, filed Dec. 6, 1966, now abandoned, a continuation of which, Ser. No. 696,478 is now Patent No. 3,441,-198, issued Apr. 29, 1969.

The present invention relates to flexible bags for use in packaging food items. More particularly, the present invention relates to flexible bags for use in packaging food items having irregular shapes and varying sizes so that the flexible bag is capable of uniformly and smoothly adhering to the surfaces of the encased food item.

The term "food item" as used throughout this application and in the appended claims should be understood to include but not be limited to all poultry and fowl, irregularly shaped meats, hams, meatloafs and the like.

The flexible bags employed in the present invention are those which are thermoplastic, and are capable of being heat sealed and include those flexible plastic bags obtained and fabricated from such plastic resins as polyvinyl chloride, plasticized polyvinyl chloride, polyethylene and the like. In a preferred embodiment of this invention, the flexible bags are also heat-shrinkable and are obtainable from similar plastic resins.

Heretofore, food items, such as dressed poultry, have been packaged in flexible bags by placing the poultry item in the bag, evacuating the air from the poultry item and the bag, closing the open end of the flexible bag and then placing the thusly encased and evacuated poultry item and flexible bag in a shrink tunnel. It has been found that the flexible bags heretofore employed to package such food items in accordance with the general packaging process described above, did not conform closely and smoothly to the surfaces of the food item placed therein before the encased food item and flexible bag were evacuated, closed and then placed in the shrink tunnel. Further, the conformity of the flexible bag to and about the surfaces of the food item were not smooth, particularly after the shrink step, which resulted in obtaining a wrinkled package wherein the flexible bag did not closely and smoothly adhere to the surfaces of the food item encased therein. In short, an unsightly packaged food item.

It is an object of the present invention therefor to provide a flexible bag having a structure wherein food items of irregular shape and size can be packaged therein such that the flexible bag closely adheres to the surfaces of the food item thusly encased.

This and further objects of the present invention will become more clear from the ensuing discussion.

The objects of the present invention can be generally accomplished by fabricating a flexible plastic bag from tubular stock in the form of a container comprising opposing side and edge walls and an opposing top and bottom. The top and bottom of the bag are formed to have a configuration that readily permits the walls of the bag to smoothly and closely adhere to the irregular surfaces of a food item packaged and encased therein.

The structure of the flexible bag of the present invention will become more clear when taken together and considered in connection with the accompanying drawing which is set forth as being illustrative of one embodiment of the present invention and is not intended, in any way, to be limitative thereof and wherein.

Figure 1:
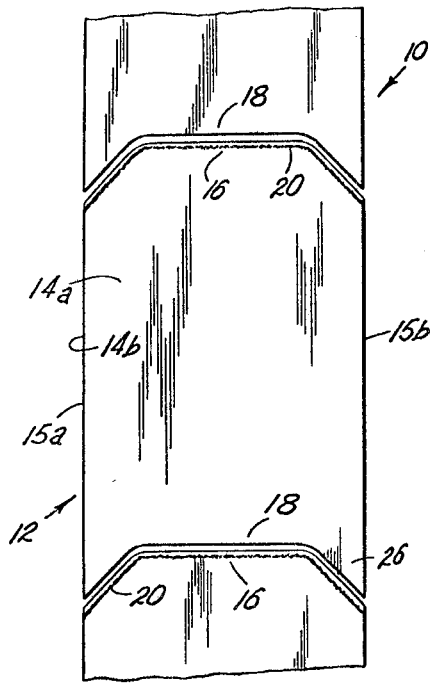
FIG. 1 is a plan view, part broken away, illustrating one embodiment of the structure of the flexible plastic bag of the present invention.

Referring now to the drawing wherein like reference numerals denote like parts, there is shown in FIG. 1 a continuous web of tubular film, generally designated by reference number 10, from which the flexible plastic bags of the present invention are obtained. Providing a continuous tubular film can be achieved by methods well known to those skilled in the art and does not form a part of the present invention. Reference numeral 12 generally designates a form cut flexible plastic bag of the present invention having in its flattened state, opposed side walls 14a and 14b, opposed edge walls 15a and 15b, a bottom 16, and a top 18. After being form cut, such as by known blanking or die cut methods the bottom 16 of flexible bag 12 is a heat-sealed by a heat seal 20 which joins together the opposed side wall 14a and 14b and extends between the opposed edge walls 15a and 15b of the flexible bag 12. The heat-seal 20 is placed at the bottom 16 of the flexible bag 12 to closely parallel the form cut configuration.

Figure 2:
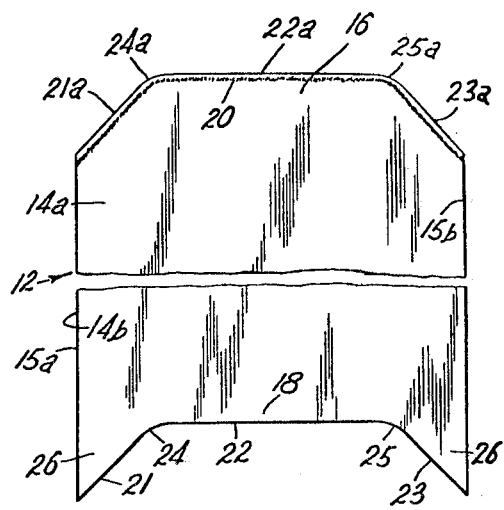
FIG. 2 is a plan view, part broken away, showing the detail structure of the flexible bag of FIG. 1.

As shown in FIG. 2, the configuration of the top 18 of flexible bag 12 is formed by straight line cuts designated by reference numerals 21, 22 and 23. These straight line cuts correspond generally to the cuts formed in the bottom 16 of flexible bag 12 and which are designated in the bottom 16 by reference numerals 21a, 22a and 23a. Arcuate cuts 24, 25 and 24a, 25a are also formed simultaneously with and placed between adjacent straight line cuts 21, 22, 23, at the top 18 and straight line cuts 21a, 22a, 23a at the bottom 16 so that the straight line cuts are joined to and communicate with the arcuate cuts. In this manner, straight line cuts 21, 22, 23 and 21a, 22a, 23a and arcuate cuts 24, 25 and 24a, 25a are caused to be coextensive with each other and form the desired configurations at the top 18 and bottom 16, respectively, of the flexible bag 12. The means employed to obtain the straight line cuts and arcuate cuts can be readily provided by a blanking knife, a single die or a plurality of dies or knives fabricated by methods well known to those skilled in the art. By virtue of the manner in which the top 18 is formed with straight line cuts 21, 22 and 23 and arcuate cuts 24 and 25, a pair of ears 26 is formed in the edge walls 15a and 15b at the top of flexible bag 12 which ears 26 facilitate handling of the flexible bag 12 as a food item is placed therein.

The top 18 of flexible bag 12 is preferably form cut so that the angle formed between edge wall 15a and straight line cut 21 and the angle formed between edge wall 15b and straight line cut 23 is about 30°. The corresponding angles formed between edge wall 15a and straight line cut 21a and edge wall 15b and straight line cut 23a, therefore, will be about 150°. Straight line cuts 21 and 23 are preferably formed to be of equal length so that corresponding straight line cuts 21a and 23a are also of equal length. It follows, therefore, that straight line cuts 22 and 22a will be equal in length to each other.

As illustrated in FIG. 1, it can be seen that when a flexible bag 12 is form cut in this manner, the top 18 of one flexible bag and the bottom 16 of the next successive flexible bag are formed with a single cut in the flattened tubular film 10. Consequently, the configuration formed in a bottom 16 mates with the configuration formed in an adjacent top 18 in the length of flattened tubular film 10.

It has been found that when a flexible bag is constructed in this manner, the configuration formed and obtained enables the flexible bag to closely and smoothly conform and adhere to the surfaces of irregularly shaped food items packaged therein since the bag walls have a tendency to be more uniformly distributed over the encased food item during the packaging process. This results primarily from the configuration formed in the bottom 16 of the flexible bag 12. It was observed that when a food item, such as a turkey, was packaged in accordance with the above-described process in a flexible bag whose bottom had a configuration as set forth hereinabove and generally indicated in FIG. 2, substantially no wrinkles were developed in the walls of the flexible bag and the flexible bag closely and smoothly adhered to the food item encased therein.

Figure 3:
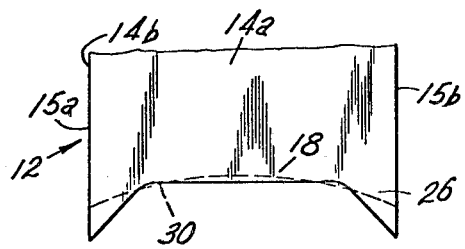
FIG. 3 is a fragmentary view, part in phantom, illustrating the significant difference between the structure of the flexible plastic bag of the present invention and the general structure of flexible plastic bags presently in commercial use.

In FIG. 3, a flexible bag 12 is illustrated having a top 18 form cut to provide a configuration as set forth hereinabove. This configuration is comparatively illustrated with a configuration generally formed in flexible bags presently in commercial use and which is shown in phantom in FIG 3 and designated therein by reference numeral 30. When turkeys were similarly packaged in presently used commercial flexible bags having a configuration indicated in FIG. 3 by reference numeral 30, it was found that wrinkles developed and formed in the walls of the flexible bag and film projections were also formed at the closed bottom end of the flexible bag. Further, the flexible bag having the configuration designated by reference numeral 30 did not smoothly and uniformly adhere to the encased food item presenting a packaged article that was unsightly.

By utilizing a flexible plastic bag having a configuration formed in accordance with this invention, it has been further found that the problem of shaping a flexible bag in two dimensions has been substantially overcome since the configuration formed in the bottom 16 of the flexible bags of this invention can be draped about the end of a three dimensional food item, such as a turkey, and subsequently tautly drawn thereabout leaving substantially no loose film surrounding the thusly encased food item.

Although the configuration formed in the flexible plastic bags in accordance with this invention have described primarily by reference to the top of the bag, it should be understood that the description is equally applicable to the configuration formed at the bottom of the bag. It should also be understood that while the preferred configuration at the top and bottom of the bag has been set forth as having three straight line cuts and joining arcuate cuts, a greater number of straight and arcuate line cuts can be provided as required or desired to provide a bottom configuration that will more closely conform to the shape of the food item to be packaged.

While the present invention has been described in some detail and with particularity, it should be understood that changes, modifications and alterations can be made therein without departing from the scope and spirit of the present invention.

What is claimed is:

1. A method for forming a flexible bag for packaging irregularly shaped food items therein, said method including the steps of:

provided a length of flattened, flexible tubular film having opposed walls in contact with each other, forming transversely across said length a straight line cut and two other adjacent straight line cuts, each of said adjacent straight line cuts being formed at an obtuse angle with respect to said straight line cut extending therebetween, forming arcuate cuts joining adjacent straight line cuts such that the cuts extend continuously from one edge of said length of flattened tubular film to the other edge thereof, and simultaneously defining with said cuts on one side thereof a convex polygonal bottom of a first bag to be formed and on the other side of said cuts a concave polygonal top of a second bag to be formed in mating engagement with each other, and sealing to each other said opposed walls of said flattened tubular film on the bottom side of and along said cuts to form said bag.

2. The method of claim 1 wherein at least two of the straight line cuts are of equal length and are each angularly disposed with respect to an edge wall of said bag.

3. The method of claim 2 wherein each of the said two equal length straight line cuts form an angle of about 150° with respect to the edge wall adjacent thereto at the bottom of said bag.

References Cited

UNITED STATES PATENTS

| 2,805,973 | 9/1957 | Klasing et al. | 93—35 XR |
| 3,086,577 | 4/1963 | Gimple | 156—510 XR |

BERNARD STICKNEY, Primary Examiner

U.S. Cl. X.R.

156—510, 515